2,698,419

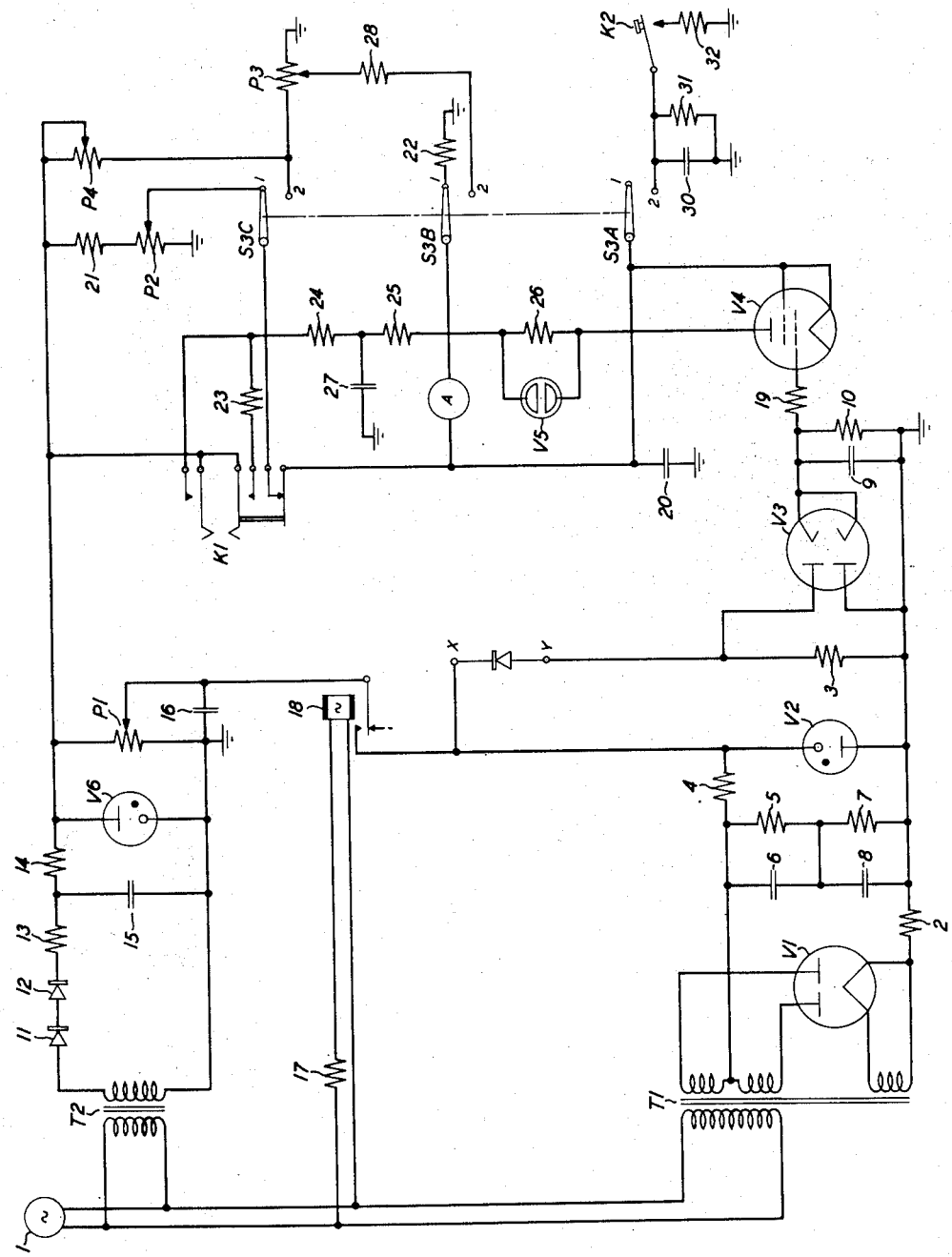

DETECTOR OF REVERSE RECOVERY EFFECT IN ASYMMETRICALLY CONDUCTIVE DEVICES

Royer R. Blair, Berkeley Heights, N. J., assignor to Bell Telephone Laboratories, Incorporated, New York, N. Y., a corporation of New York Application February 20, 1953, Serial No. 338,021

5 Claims. (Cl. 324—158)

This invention relates to a device for indicating and measuring the reverse recovery effect in asymmetrically conductive devices.

The object of the invention is a method and means for indicating and measuring the carriers of electric charges in an asymmetrically conductive device.

A feature of the invention is a switching circuit for supplying to the device a current flowing in the forward or passing direction; for rapidly and recurrently interrupting the current flow, and for applying to the device a voltage in the reverse or blocking direction.

Another feature of the invention is a circuit for detecting the flow of carriers of electric charges from the device in the reverse or blocking direction; for indicating when the quantity of electricity carried by these carriers exceeds a desired amount; and for measuring the effect of this quantity of electricity.

The conductivity of an asymmetrically conductive device in the forward, or passing direction, is greater than the conductivity in the reverse, or blocking direction, hence such devices are potentially capable of use as rectifiers, detectors, controllable resistors, etc. Among the common types of asymmetrically conductive devices are semiconductors, such as germanium, selenium, copper-oxide, etc., thermionic devices, and many other devices.

In some asymmetrically conductive devices, the current in the forward direction is believed to be due largely, or entirely, to electric charges carried by relatively free, mobile electrons. In other devices, such as impure crystalline semiconductors, the current in the forward direction is believed to be due to electric charges carried by relatively free electrons, and to charges carried by electrons more or less intimately associated with the crystal lattice.

If the impurity in a crystal lattice has a valence greater than the valence of the substance forming the lattice the forward current is believed to be due largely to electric charges carried by the surplus valence electrons, though some of the charges may be carried by electrons dislodged from the crystal lattice; whereas, if the impurity in a crystal lattice has a valence less than the valence of the substance of the lattice, the forward current is believed to be due largely to electric charges carried by valence electrons drawn from the lattice to increase the number of electrons associated with the impurity, thus creating holes, or local deficiencies of electrons in the lattice, which travel through the lattice under the influence of the applied field.

When the forward current in an asymmetrically conductive device is cut off, and voltage in the reverse direction is simultaneously applied, a spurt of current of extremely short duration, of the order of $10^{-9}$ seconds, will flow; followed by a smaller current which decreases exponentially to the steady value of reverse current. The initial spurt of current is believed to be produced by relatively mobile electrons in transit between the electrodes; while the following current is believed to be produced, by carriers, electrons or holes, more intimately associated with the structure of the material between the electrodes. This reverse recovery effect may be detrimental to the use of the device as a gate, pulse generator, detector, etc.

The present set provides a simple, rapid method and means for indicating when the reverse recovery effect of an asymmetrically conductive device exceeds a desired limit.

The drawing schematically discloses a preferred embodiment of the invention.

The primary winding of transformer T1 is connected to a suitable source of alternating current 1; the ends of one secondary winding of transformer T1 are connected to the anodes of double wave rectifier V1; another secondary winding of transformer T1 is connected to the filament of rectifier V1. Other secondary windings of transformer T1 may be connected to the heaters (not shown) of tubes V3, V4.

The asymmetrically conductive device to be tested is inserted between the terminals X, Y; and current can then flow from the cathode of rectifier V1, through resistors 2, 3, the device under test, resistor 4, secondary windings of transformer T1 and anodes of rectifier V1. The resistances of resistors 2, 4, are large compared to the resistances of resistor 3 and the device under test, so that, for a wide range of resistances of the device under test, the current in the forward, or passing direction, through the device is substantially constant. For a normal value of this current, the voltage drop across resistor 3 and the device under test is of the order of a few volts. The pulsating unidirectional current from the rectifier V1 is smoothed by the filter formed of resistors 2, 5, 7, and capacitors 6, 8. For the protection of the operator, the voltage regulator tube V2 limits to a safe value the voltage across terminals X, Y, when the device is removed.

As current might leak through the insulation of the upper diode of the twin diode V3 and charge the upper terminal of capacitor 9 negative with respect to ground when forward current is flowing through the device under test, the lower diode of the twin diode V3 is connected directly across the capacitor 9 to prevent any such charge from forming.

The primary winding of transformer T2 is connected to the source 1 while the secondary winding is connected through rectifiers 11, 12, resistors 13, 14, and the winding of potentiometer P1. The pulsating direct current is smoothed by resistors 13, 14, and capacitor 15; while the output voltage is regulated by tube V6. The brush of potentiometer P1 is adjusted to select a suitable value of reverse voltage, which is usually higher than the voltage drop across the device in the passing direction.

The winding of relay 18 is connected through resistor 17 to the source 1, so that relay 18 vibrates at the frequency of source 1, operating say, sixty times per second. When the contacts of relay 18 close, the voltage selected by the brush of potentiometer P1 is applied, in the reverse, or blocking, direction to the device under test and resistor 3. At the same time, the current from rectifier V1 is shunted around the device under test, flowing from resistor 2, through ground, winding of potentiometer P1 and contacts of relay 18 to resistor 4. The charge on capacitor 16 aids this action.

Although the capacitance of capacitor 9 is only a few hundred micromicrofarads, the time constant of this capacitance and the resistance of the upper diode of tube V3 is of the same order as the time of duration of the initial pulse of reverse current, thus, this pulse probably is integrated. The following exponentially decaying pulse is stored in capacitor 9, and leaks away comparatively slowly through resistor 10. Whatever the exact process may be, the result of the successive operations of relay 18 is to build up and stabilize a voltage across resistor 10 representative of the reverse recovery effect of the device being tested.

The ungrounded terminal of resistor 10 is connected through the current limiting resistor 19 to the first grid of the gas-filled tube V4. The cathode and second grid of the tube V4 are connected to ground through capacitor 20, and to the blade of switch S3A, and the lower spring of key K1.

The winding of potentiometer P2 is connected in series with resistor 21 across the power supply associated with transformer T2. With switch S3 in the upper position, the brush of potentiometer P2 is connected through switch S3C–1, and the lower springs of key K1, to the cathode of tube V4, and may be adjusted to bias the cathode of tube V4 a desired amount above the critical firing voltage of the tube. Meter A is connected from the cathode of tube V4 through switch S3B–1 and resistor 22 to ground, to read the bias voltage applied to the cathode. Meter A may conveniently be deflected full scale by a current of 100 microamperes, thus, if resistor 22 has a resistance of 100,000 ohms, the full scale deflection of meter A will indicate a bias of 10 volts.

The bias is adjusted to the desired value, as indicated on meter A; the device to be tested is connected to terminals X, Y; then key K1 is operated to close the upper springs, connecting the power supply associated with transformer T2 through resistors 24, 25, 26, to the anode of tube V4. Capacitor 27, connected from the junction of resistors 24, 25 to ground, slows the build up of the voltage applied to the plate of tube V4 and prevents spurious firing of tube V4 when the key is operated. A small neon lamp V5 is shunted across resistor 26. If the voltage developed across resistor 10 exceeds the desired value, tube V4 will break down, lighting lamp V5, to indicate the device has failed to pass the test. Key K1 may then be restored to normal, opening the anode supply to tube P4 and extinguishing this tube.

In some cases, when the voltage developed across resistor 10 is insufficient to overcome the bias from potentiometer P2, it may be desirable to indicate the magnitude of the voltage developed across resistor 10. Key K1 is manipulated to close the middle contacts, connecting the power supply associated with transformer T2 through resistors 23, 24, 25, 26 to the anode of tube V4; and opening the lower contacts to cut off the biasing voltage from potentiometer P2. Capacitor 20 will then commence discharging through meter A, switch S3B–1 and resistor 22. The time constant of capacitor 20 and resistor 22 may be of the order of ten seconds, hence the bias on the cathode of tube V4 will decrease rather slowly. Eventually, the bias on the cathode of tube V4 will become small enough that the voltage across resistor 10 can break down tube V4, flashing tube V5, and causing the reading of meter A to suddenly change. The reading on meter A just prior to the sudden change indicates the bias voltage at which tube V4 fired and by subtracting from this value the critical firing voltage of the tube a measure of the voltage developed across resistor 10 is obtained.

In some of the newer types of asymmetrically conductive devices, this differential indication on meter A is too small to permit accurate reading. To obtain greater sensitivity switch S3 may be moved to the lower contacts. The windings of potentiometers P3, P4 are connected in series across the power supply associated with transformer T2. The cathode of tube V4 is connected through meter A, switch S3B–2 and resistor 28 to the brush of potentiometer P3. Resistor 28 may have a resistance of 10,000 ohms, so that meter A will read one volt full scale. The brush of potentiometer P3 is adjusted to bias the cathode of tube V4 just at the critical value. With the lower springs of key K1 closed, potentiometer P4 is adjusted until meter A reads full scale, thus biasing the cathode of tube V4 one volt above the critical value. This arrangement spreads a one-volt differential range over the entire scale of meter A and permits the meter to be read with much greater accuracy. As resistor 28 has a smaller resistance than resistor 22, the time constant is reduced, hence switch S3A–2 connects capacitor 30 and resistor 31 in parallel with capacitor 20 and resistor 28 to increase the time constant to ten or twenty seconds.

The device to be tested is connected to terminals X, Y, and key K1 manipulated to close the center contacts, to supply power to the anode of tube V4; and to open the lower contacts to permit capacitors 20, 30 to discharge. When the bias on the cathode of tube V4 has decreased sufficiently, the voltage across resistor 10 will break down tube V4, causing lamp V5 to flash, and the reading of meter A to suddenly change. To reduce the time required for this test, key K2 may be momentarily closed, permitting capacitors 20, 30, also to discharge through resistor 32.

What is claimed is:
1. A detector of the reverse recovery effect in an asymmetrically conductive device comprising means for transmitting normal forward current through the device, means for recurrently reducing the forward current through the device to a small value, means for recurrently applying reverse voltage to the device, electrostatic means for storing the momentary flows of carriers of electrical charges due to the applications of reverse voltage, and means for indicating the voltage developed across said storage means.

2. A detector of hole storage in an impure crystalline material comprising means for transmitting forward current through the material, means for reducing to a small value the forward current, means for simultaneously applying reverse voltage to the material, and means for indicating the magnitude of the momentary flow of reverse current due to the application of the reverse voltage.

3. A detector of the reverse recovery effect in an asymmetrically conductive device comprising a resistor connected in serial relationship from said device to ground, a constant current supply connected in the forward direction across said device and said resistor, a source of voltage, switching means for recurrently reducing the forward current through the device to a small value and connecting said source of voltage in the reverse direction across said device and said resistor, a grounded capacitor, a rectifier connecting the free terminal of said capacitor to the junction of said device and said resistor, and poled to pass reverse current a leak resistor connected across said capacitor, and means for indicating the voltage developed across said leak resistor by the recurrent flows of current due to the applications of the reverse voltage.

4. The combination in claim 3 in which said indicating means includes a gas-filled device having an anode, a cathode, and a control electrode, means connecting said control electrode to the free terminal of said grounded capacitor, a second capacitor connected from said cathode to ground, a voltmeter connected across said second capacitor, means for energizing said anode and said cathode, and means connected to said cathode to bias said cathode to a desired potential.

5. The combination in claim 4 with means for disconnecting said biasing source from said cathode, so that said second capacitor will discharge through said voltmeter, whereby a sudden change in the reading of said voltmeter, produced when said gas-filled device breaks down, indicates that the voltage read just prior to said sudden change is the voltage developed across said leak resistor.

References Cited in the file of this patent
UNITED STATES PATENTS

| Number | Name | Date |
| --- | --- | --- |
| 2,406,405 | Salisbury | Aug. 27, 1946 |